(12) United States Patent
De Haan

(10) Patent No.: US 8,896,752 B2
(45) Date of Patent: Nov. 25, 2014

(54) ILLUMINATION SYSTEM FOR ENHANCING THE APPEARANCE OF AN OBJECT AND METHOD THEREOF

(75) Inventor: Gerard De Haan, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 272 days.

(21) Appl. No.: 13/393,051

(22) PCT Filed: Sep. 3, 2010

(86) PCT No.: PCT/IB2010/053973
§ 371 (c)(1),
(2), (4) Date: Feb. 28, 2012

(87) PCT Pub. No.: WO2011/030267
PCT Pub. Date: Mar. 17, 2011

(65) Prior Publication Data
US 2012/0154636 A1    Jun. 21, 2012

(30) Foreign Application Priority Data
Sep. 11, 2009 (EP) .................... 09170065

(51) Int. Cl.
| | |
|---|---|
| H04N 5/228 | (2006.01) |
| H04N 5/208 | (2006.01) |
| H04N 5/222 | (2006.01) |
| G06K 9/42 | (2006.01) |
| G06K 9/44 | (2006.01) |
| H05B 37/02 | (2006.01) |
| G03B 15/02 | (2006.01) |
| H04N 5/225 | (2006.01) |
| G03B 21/26 | (2006.01) |

(52) U.S. Cl.
CPC .............. *H05B 37/029* (2013.01); *G03B 15/02* (2013.01); *H04N 5/2256* (2013.01); *G03B 21/26* (2013.01)
USPC ......... 348/370; 348/222.1; 348/252; 382/266

(58) Field of Classification Search
USPC ...................... 348/222.1, 241, 252, 253, 370; 382/263, 266, 269; 600/473
See application file for complete search history.

(56) References Cited

U.S. PATENT DOCUMENTS 5,003,166 A * 3/1991 Girod .......................... 250/201.4
5,969,754 A * 10/1999 Zeman .......................... 348/136
(Continued)

FOREIGN PATENT DOCUMENTS

| JP | 2001522544 A | 11/2001 |
|---|---|---|
| JP | 2005352171 A | 12/2005 |

(Continued)

OTHER PUBLICATIONS

Amano et al: "Appearance Enhancement Using a Projector-Camera Feedback System"; 19th International Conference on Pattern Recognition, 2008 IEEE, pp. 1-4.
Amano et al: "Real World Dynamic Appearance Enhancement With Procam Feedback"; Proceedings of the 5th ACM/IEEE International Workshop on Projector Camera, Aug. 2008, Article 5, pp. 25-26.

*Primary Examiner* — Daniel M Pasiewicz

(57) ABSTRACT

A system for enhancing the appearance of an object comprises an illumination device (5) for providing enhancement illumination and a light recording device (1) for recording the reflection by the object of illumination on the object. A reference illumination is mixed (8) with the enhancement illumination. The information in the reflected light is filtered (9) to filter the reflection data (1) due to the reference illumination. These data are used for calculating the enhancement illumination in a processor (3).

18 Claims, 10 Drawing Sheets

(56) References Cited

U.S. PATENT DOCUMENTS

| | | | |
|---|---|---|---|
| 8,279,329 B2 * | 10/2012 | Shroff et al. | 348/370 |
| 8,494,616 B2 * | 7/2013 | Zeman | 600/473 |
| 2002/0006282 A1 * | 1/2002 | Ushiro et al. | 396/429 |
| 2004/0105264 A1 | 6/2004 | Spero | |
| 2008/0260242 A1 | 10/2008 | MacKinnon et al. | |
| 2009/0046164 A1 * | 2/2009 | Shroff et al. | 348/222.1 |

FOREIGN PATENT DOCUMENTS

| | | |
|---|---|---|
| JP | 2007042318 A | 2/2007 |
| WO | 9826583 A1 | 6/1998 |
| WO | 2006126122 A2 | 11/2006 |

* cited by examiner

\+ 4

\+ 4

———————————————— -

ILLUMINATION SYSTEM FOR ENHANCING THE APPEARANCE OF AN OBJECT AND METHOD THEREOF

FIELD OF THE INVENTION

The invention relates to an illumination system comprising a light recording device for producing recorded image data of an object, an illumination device and a processor for generating from recorded image data enhancement illumination data wherein the enhancement illumination data are provided to the illumination device for illuminating the object with an enhancement illumination to enhance the appearance of the object.

BACKGROUND OF THE INVENTION

Illumination systems are becoming ever more sophisticated. We witness an evolution in illumination systems where the brightness and/or colours of the illumination have become adaptable.

A system as described in the opening paragraph is known from 'Real World Dynamic Appearance enhancement with Procam Feedback' by Toshiyuki Amano and Hirokazu Kato, Procams 2008, Marina del Rey, Calif., Aug. 10, 2008. This known system comprises a camera to allow feedback from the illuminated scene. Such feedback can be used to highlight specific objects or scenes in the interior, but also to perform image enhancement of art objects, like paintings. The system enhances the reality, and provides a clearer, crisper image. Within the concept of the invention an object is any object that is illuminated. Examples of such objects are displays, pictures, paintings, persons, trees, whether alone or in a group, whether as a whole or a segment of a person, tree etc.

The main problem of a reality enhancement lighting system is to get a stable result. A feedback loop between the light recording device and the illumination device leads to an unstable system. For ease of understanding, but not as a restriction, a light recording device will be below sometimes also called a camera and an illumination device a projector. The image projected by the projector on the object changes the appearance of the object as seen by the camera, which leads to further enhancement in the next projected image on the object, which leads to a yet further change of the appearance of the object as seen through the camera etc. This may lead to a runaway effect in which the enhancement keeps on increasing.

Amano et al. offer a solution they call "partial feedback". The feedback gain is considerably reduced. The reduction in feedback gain keeps the run-away effect in check. Although this apparently leads to a fairly stable system for static scenes it introduces a significant latency of the enhancement system, which makes the system less suited for dynamic scenes (operation theatre, car headlights etc.). Also the known system reacts nervously on changes in ambient illumination due to moving objects in the environment and has problems with edges of objects in an image.

It is an object of the invention to provide an illumination system and illumination method in which one or more of the above problems are reduced.

SUMMARY OF THE INVENTION

To this end the illumination system is characterized in that the illumination system comprises a generator for generating a reference illumination for illuminating an object with a mix of the reference illumination and the enhancement illumination and the system comprises a filter for filtering, from the light impinging on the light recording device, object reflected reference image data wherein the object reflected reference image data are an input to the processor for generating the enhancement illumination data.

The inventors have realized that it is important that the illumination system is able to distinguish an original scene, i.e. an object under a reference illumination without the feedback loop, from an illumination enhanced scene, i.e. when the object is illuminated by the enhancement illumination. In the invention information of the object under reference illumination is used for providing the enhancement illumination. The prior art system does not have this possibility.

Illuminating an object with a mix of a reference illumination and an enhancement illumination, in combination with filtering the reflection due to the reference illumination from the reflected light and, in addition, using the reference illumination data for generating the enhancement illumination removes the runaway effects of a feedback loop. The enhancement illumination is based on data for a reference illumination of the object.

Preferably the filter is a data filter for filtering data recorded by the light recording device.

Alternatively the filtering can be done in the optical domain, i.e. for instance by a time controlled shutter in front of the light recording device. Filtering Recorded data filtering preferred.

In embodiments of the invention the illumination system comprises a reference illumination device for producing the reference illumination and an enhancement illumination device for producing the enhancement illumination, wherein the enhancement illumination data are provided to the enhancement illumination device.

Using two separate illumination devices for reference illumination and enhancement illumination has the advantage that any physical requirement that is put on the reference and/or enhancement illumination or illumination device does not influence and/or put restrictions on the other illumination or illumination device.

The disadvantage is that two separate illumination devices are to be used, which could lead to alignment problems.

In preferred embodiments the reference illumination device and the enhancement illumination device share a common optical unit.

This reduces alignment problems between the two light sources.

In the above mentioned embodiments two separate illumination devices are used and the mix of reference and enhancement illumination is made in the optical domain, i.e. by shining from two optical sources onto the object.

The mix can also be made, in preferred embodiments, by using a common illumination device, which reduces the number of illumination devices. Using a common illumination source for generating reference and enhancement illumination reduces the complexity of the system.

In such embodiments the illumination system is preferably characterized in that the system comprises a reference signal means for providing reference illumination data and a mixer for mixing the reference illumination data with the enhancement illumination data wherein the mix of reference illumination data and enhancement illumination data is provided to a common illumination device. Preferably the system comprises a filter for filtering, from the recorded image data, object reflected reference image data wherein the object reflected reference image data are an input to the processor for generating enhancement illumination data.

By mixing reference data and illumination data prior to sending them to an illumination device and using a common illumination device to emit a mix of a reference illumination as well and an image enhancement illumination the system is able to distinguish a reference illumination situation from an illumination enhanced situation, even though a common illumination device is used. The results from a reference illumination are used as an input for the enhancement illumination, as it is in the embodiments in which more than one illumination devices are used. Preferably at the recording side a filter is provided to filter out data for the reference illumination from recorded data.

In all embodiments runaway effects of a feedback loop can be avoided or at least kept in check while still being able to provide illumination enhancement which is of special importance in dynamic scenes. Within the concept of the invention mixing comprises all manners for mixing signals, whether in the optical domain, i.e. using more than one illumination device, or in the electrical domain, i.e. by mixing electrical signals before sending them to a common illumination device. Such mixing methods include time and spatial modulation, adding of alternating signals as well as time multiplexing signals. Such methods allow, at the recorded side, to apply a filter, whether it be filter based on a time period, a time frequency or a spatial frequency, and whether in the optical or in the electrical or electronic domain, to filter the reference illumination from the mix of reference and enhancement illumination.

In an embodiment the system comprises a multiplexer for time multiplexing the enhancement illumination with the reference illumination and the filter comprises a demultiplexer for time de-multiplexing the recorded image data.

Demultiplexing is equivalent to applying a time filter on the recorded image data. For certain time slots the recorded data correspond to reference illumination of the object and for other time slots to enhancement illumination.

Alternatively, the system comprises a modulator for modulating the enhancement illumination in the temporal domain with the reference illumination and the filter comprises a time demodulator for time demodulating recorded image data for providing object reflected reference image data. This allows a reference illumination of the object to be determined from for instance the difference of the odd and even frames in case the modulation is performed by adding and subtracting reference data from odd respectively even frames or vice versa. Temporal demodulation is a form of filtering.

In another implementation the mixer comprises a modulator for spatially modulating the enhancement illumination with the reference illumination, and the filter comprises a demodulator for spatially demodulating the image of the enhanced scene to provide object reflected reference image data. Spatial demodulation is a form of filtering.

The reference illumination is preferably a uniform illumination.

The projection of an image can be made in a manner in which simultaneously a complete image is projected or in a scanning manner in which pixels are scanned or lines of the image are scanned.

Combinations of embodiments are also possible.

In preferred embodiments the illumination system is arranged to allow aligning the object dependent illumination with the object.

Although using a reference illumination in the processing eliminates the problem of fluctuations due to runaway effect in the feedback loop, a perfectly uniform reference illumination also makes it in circumstances impossible to find correspondence between the pixels of the projected image and of the recorded image. In other words it is difficult to align the illumination pixels and recorded image pixels. By arranging the illumination system to allow alignment this disadvantage is removed.

In embodiments a common optical system is used for an illumination device and the recording device. Using a common optical system reduces the risk of misalignment.

In preferred embodiments in the reference illumination spatial markers are provided and one or more images are recorded and the images are analysed for finding the spatial markers. By including spatial markers in the reference illumination the correspondence between pixels of the illumination and of the recorded image can be analyzed which can be used for aligning the projection with the object.

A spatially modulated pattern can be used to provide alignment markers for registering alignment of the light recording an the enhancement illumination.

Alternatively pixels of the illumination device can be provided with a distinguishing signal.

Alternatively pixels of the illumination device can be made to emit light invisible to the human eye, but detectable to the light recording device.

Some of the pixels can be made to emit infrared light. This would be invisible for the human eye, but would be visible to a camera, provided the camera has infrared detection capabilities. This allows alignment of the illumination to the object.

The higher the density of alignment markers is the better alignment can be performed.

In embodiments the system comprises a single recoding device and multiple illumination devices, wherein the reference illuminations of the illumination devices are distinguishable.

In such embodiments a single recording device can be used for monitoring the illumination of more than one object, or illumination of various sides from a single object.

In preferred embodiments the mix of reference illumination and enhancement illumination is such that an average of the total illumination substantially equals an average of the enhancement illumination. In such embodiments the average of the reference illumination is substantially zero. The average may be in time or over the image. This reduces the visibility of the reference illumination to the human eye.

The method according to the invention is a method method for illuminating an object wherein an image is recorded of an object for producing recorded image data of the object, an image of the object is projected on the object using illumination data and wherein the object is illuminated with a mix of a reference illumination and an enhancement illumination and the recorded image is filtered to supply object reflected reference image data wherein the object reflected reference image data are used for generating the illumination illumination.

BRIEF DESCRIPTION OF THE DRAWINGS

These and further aspects of the invention will be explained in greater detail by way of example and with reference to the accompanying drawings, in which.

DETAILED DESCRIPTION OF PREFERRED EMBODIMENTS

Figure 1:
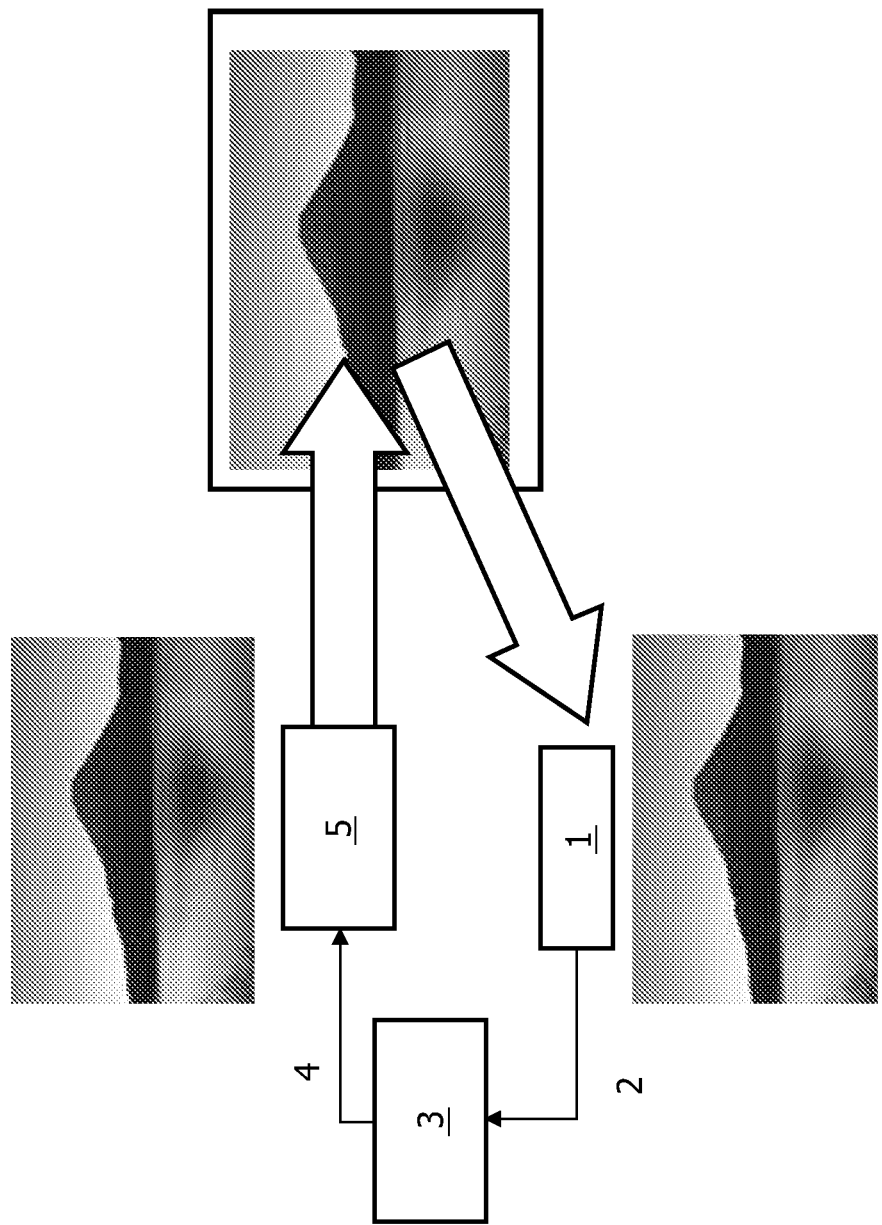
FIG. 1 illustrates an illumination system.

FIG. 1 shows an illumination system. The illumination system comprises a light recording device, in this example camera 1, for capturing the reflected image of an object. In this example the object is a picture of a mountain. The recorded signal 2 is sent to a processor 3. The processor 3 generates a signal 4 for controlling an enhancement illumination device 5. This illumination device is capable of projecting an image on the object. The illumination device 5 projects an image of the picture onto the picture. In this way the image of the picture can be enhanced. The superposition of the original picture with the projected picture enhances the contrast and range of the image. Bright spots can be made brighter in appearance.

Figure 2:
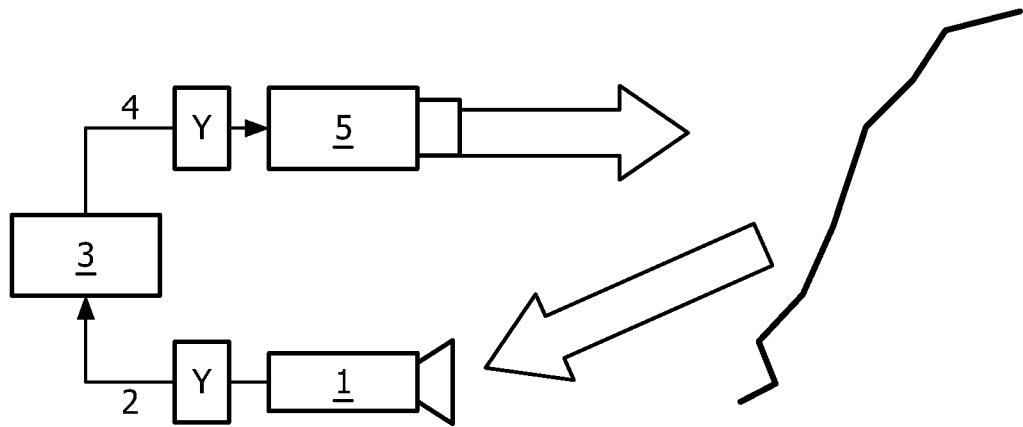
FIG. 2 illustrates a known illumination system.

FIG. 2 illustrates a system known from Amano et al. A gamma curve correction • is introduced into the chain. Not shown in the figure is the fact that a feedback gain G is also introduced into the system. The feedback gain is chosen to improve converge speed of the feedback loop and avoid overflow of the output power. The line at the right hand side of the figure very schematically illustrates a surface form which light is emitted and onto which light is projected. Although not shown in the following figures the use of gamma curve correction can also be applied in one or more or any of the embodiments of the invention.

This known system supposedly leads to a fairly stable system for static scenes. However, it introduces a significant latency of the enhancement system, which makes the system less suited for dynamic scenes (operation theatre, car headlights etc.). The indicated response time is 0.44 sec. Also the system, as the inventors have seen, reacts nervously on changes in ambient illumination due to moving objects in the environment and has problems with edges of objects in an object. Even small fluctuations lead to fluttering of the image around edges of the object.

Figure 3:
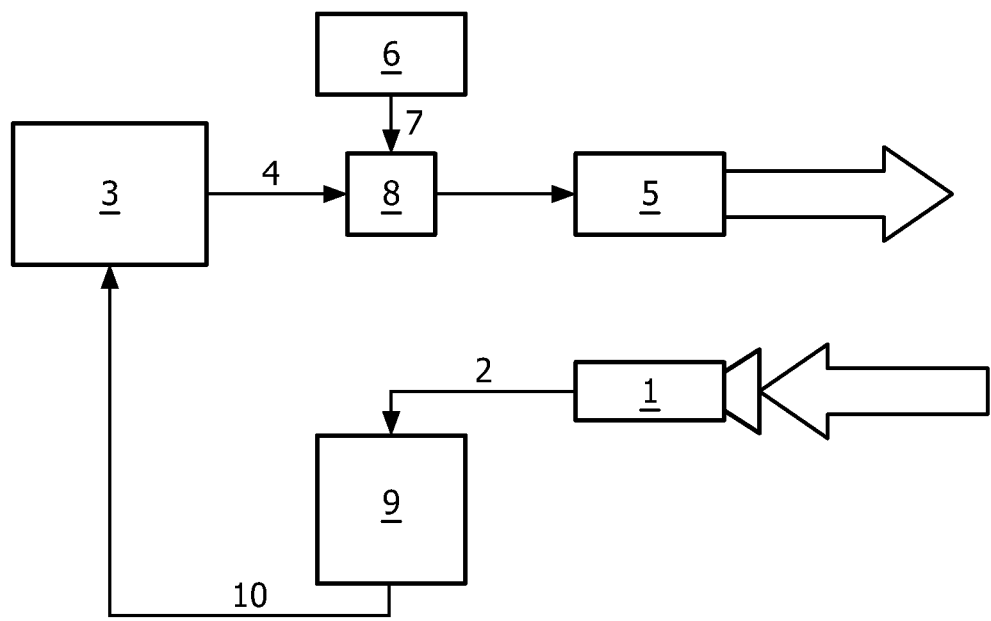
FIG. 3 illustrates an embodiment of an illumination system in accordance with the invention.

FIG. 3 illustrates a system in accordance with an embodiment of the invention.

To the enhancement signal 4, comprising enhancement illumination data, a reference signal 7, comprising reference illumination data, is mixed. The system comprises a reference signal generator 6 for generating this reference signal 7. The mixer 8 mixes this reference signal with the enhancement signal 4. The mixed signal is lead to the projector 5 and an image is projected. The image received by the camera 1 is thus the result of a mix of two signals, the enhancement signal 4 and the reference signal 7 generated by reference generator 6, i.e. the illumination of the object is a mix of reference illumination and enhancement illumination. The system comprises a filter 9 for filtering out the image data 10 caused by the reference signal 7 due to the reflection by the object of the reference illumination. This signal comprising the image data 10 is lead to the processor 3.

The inventor has realized that a feedback loop between camera and projector leads to an unstable system as the projector changes the appearance of the object seen by the camera, which would lead to another enhancement in the next projected image to the object, etc. . . . The enhancement in the feedback loop may cause fluctuation in illumination leading to an unstable situation.

In the embodiment of FIG. 3 of the invention the projector is used to generate a reference illumination, for instance a uniform white light illumination. A signal for making a reference illumination is generated by the reference generator 6 and mixed with the signal for producing an enhancement illumination coming from the processor 3. By filtering the response to the reference illumination from the signal received by the camera a stable situation is obtained. The reference reflected image signal 10 is used for generating the enhancement signal 4. Since the reference reflected image signal 10 is a known and stable signal fluctuations are absent or at least strongly reduced.

Figure 4:
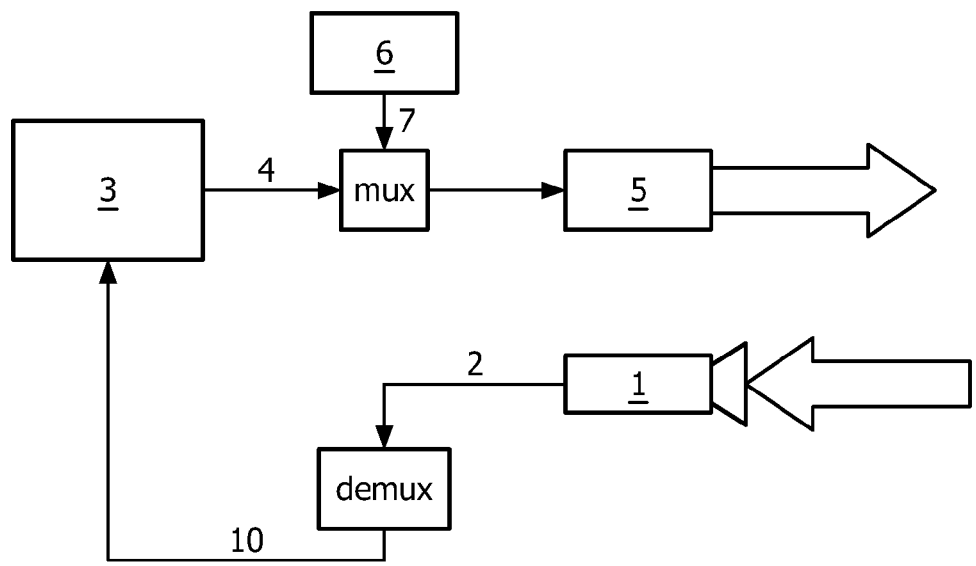
FIGS. 4 and 5 illustrate an embodiment of an illumination system in accordance with the invention.
Figure 5:
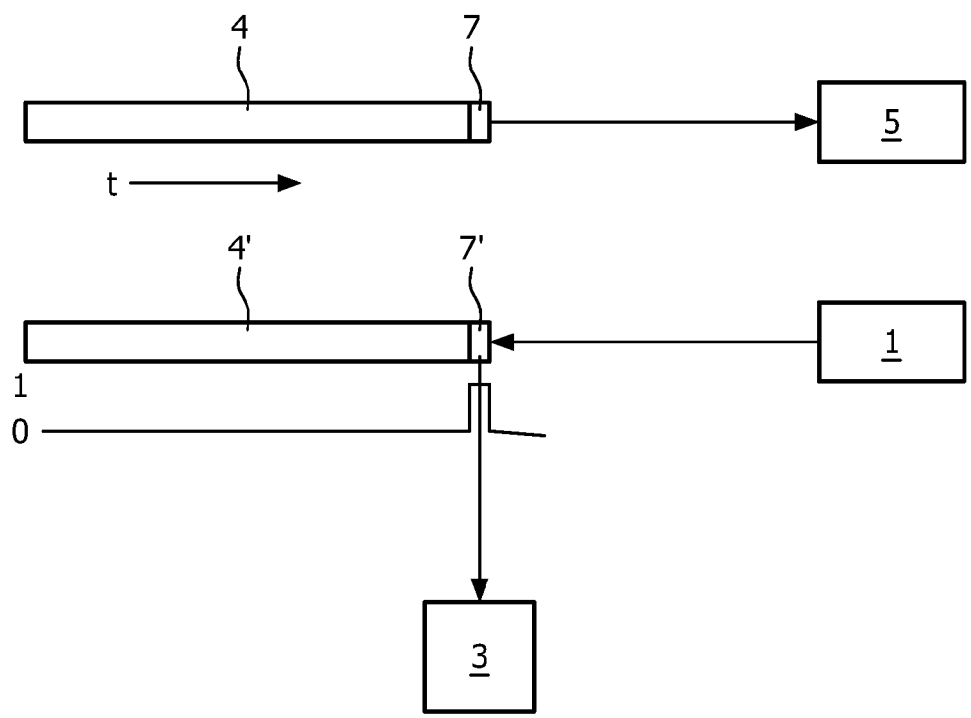

One embodiment of mixing is illustrated in FIGS. 4 and 5. In this embodiment the signal after mixer 7 is multiplexed in time. A relatively short time period is assigned to the reference illumination, while the rest of the time the enhancement signal 4 is sent to projector 5. The mixer comprises a multiplexer MUX and the filter at the receiving part of the system comprises a corresponding demultiplexer DEMUX.

In the camera the image is also collected in time slots, wherein there is a time slot that corresponds to the reference illumination. The image signal 4' as received by the camera corresponds to enhancement signal 4; the signal 7' corresponds to reference signal 7. It is the signal of the time slot 7 that is used in processor 3. In this figure this is schematically illustrated with the stepped line. The part of the signal corresponding to enhancement signal 4 is multiplied by zero, the part corresponding to reference signal 7 with a factor of 1. This amounts to time-demultiplexing the recorded image signal at the camera end. It is remarked that the camera also receives the image resulting from the enhancement signal, and by using more complex time de-multiplexing this signal can also be isolated. In embodiments this enhancement signal may also be sent to and analysed by processor 3, for instance for purposes of fine-tuning or checking the image enhancement effects. In this embodiment one time slot of the time multiplexing is used for the reference signal, the rest is used for the enhancement signal.

Figure 6:
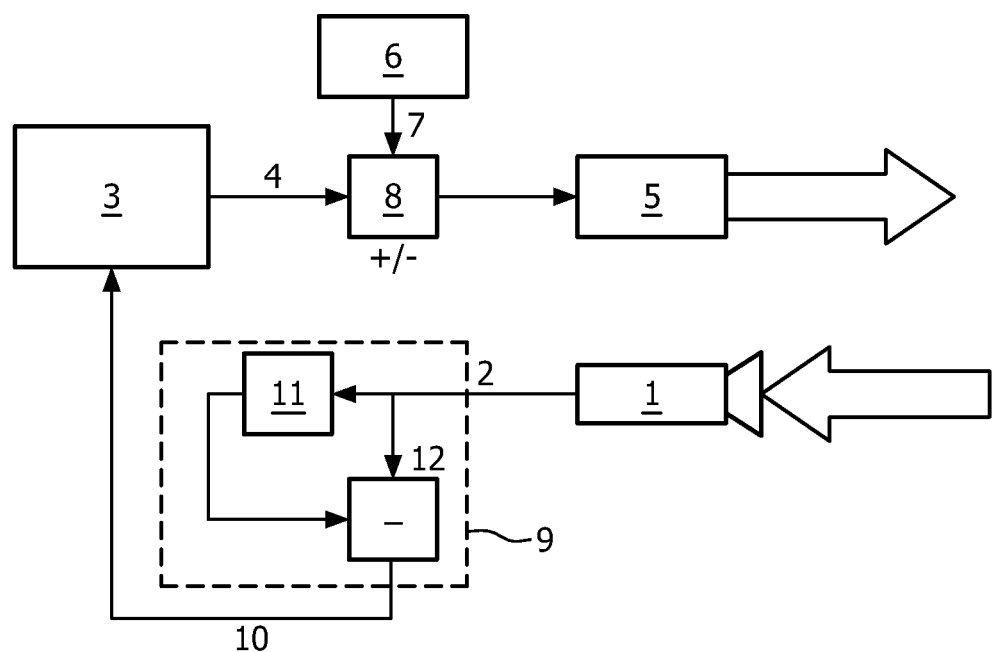
FIG. 6 illustrates an embodiment using temporal modulation.

FIG. 6 illustrates another embodiment of the invention. In this embodiment the enhancement is modulated in the temporal domain by adding/subtracting a reference signal to odd/even images. Even images than show an image caused by a signal formed by enhancement signal 4+ reference signal 7, while odd images show an image caused by a signal formed by enhancement signal 4− reference signal 7. This is schematically shown in FIG. 6. The mixer 8 adds to and subtracts from the enhancement signal 4 in respectively odd and even frames a reference signal 7 representing an even illumination. The filter 9 comprises in this embodiment a time delay 11 and a subtractor 12. In the subtractor 12 two signals of subsequent frames are subtracted. One of the image signals is formed by the enhancement signal 4 plus the reference signal 7, the other image signal by the enhancement signal minus the reference signal 7, or only the enhancement signal.

The subtraction of the two signals of odd and even frames makes the enhancement signal 4 drop out, leaving only the reference signal 7, or, more accurately, twice the reference signal 7. It is remarked that the difference signal in fact provides two values, namely plus or minus twice the reference signal depending on the whether one subtracts odd from even or even from odd frames. The absolute value of the difference signal can be fed into the processor 3. The subtractor has the function of time demodulating the recorded image data to provide the object reflected reference image data. Generalizing the scheme of FIG. 6 the scheme comprises a time modulator wherein the enhancement signal is time modulated with the reference signal. At the recording end a time demodulator is applied for time demodulation of the recorded signal, providing the reference image signal, i.e. the image due to a known reference illumination. This reference signal 10 is then used in processor 3.

In more sophisticated embodiments motion compensation may be applied to compensate for temporal motion of parts of the image between the odd and even frames.

It is remarked that the image caused by solely the enhancement signal 4 can be found by adding odd and even frames. This object reflected enhancement signal can also be sent to the processor 3 for further analysis.

In both of the embodiments of FIGS. 4 and 5 reference image signal 10 is produced and this is sent to processor 3 for providing an enhancement signal 4.

The advantage of the embodiment of FIG. 6 in which the reference signal is alternately added and subtracted is that the average intensity and colour is hardly or not at all changed. Preferably the reference illumination is only a small portion of the enhancement illumination. In embodiments wherein to the enhancement signal alternately a reference signal is added and subtracted the enhancement signal will have to have a minimum value equal to the reference value. A variation would be to add in odd frames no reference signal and in even frames a reference signal. This would remove restrictions on a minimum value in the enhancement signal. It would, however, influence the average intensity and colour.

A slightly more complex system comprises means to superpose onto the enhancement signal for a frame a pattern of spatially alternating areas with positive and negative sign and with negative and positive sign for a subsequent frame. An example of such a pattern is a checkerboard pattern. This will reduce the visibility of the addition of the reference signal to the enhancement signal. The visibility can further be reduced by shifting the position of the patterns in time or using various patterns consecutively. A pattern in a honey-bee structure or any other repetitive pattern may also be used. In a simple embodiment adjacent pixels of the illumination device form a checkerboard pattern.

By subtracting subsequent image signals the enhancement signal again drops out, leaving only the reference signal.

Using a pattern, as for instance a checker board pattern, has the further advantage that the influence of a pixel of the projected image is traceable on the recorded image. Using a system wherein the reference illumination is a simple uniform illumination over the whole of the projector does not allow tracing the correspondence between pixels in the projected image and in the image seen by the recording device. Alignment problems between projected image and recorded images can then not be traced and remedied. Using a pattern such as for instance a checkerboard pattern allows aligning the projected image onto the image.

Any type of alignment markers can be used for this purpose, but a spatial pattern in the projected reference signal is a useful and simple means to accomplish this, since a pattern offers a number of markers at known relative positions.

Another option for providing markers in the reference signal is to have some of the pixels emit light invisible to the human eye, but detectable to a camera, such as for instance infrared or ultraviolet.

Figure 7:
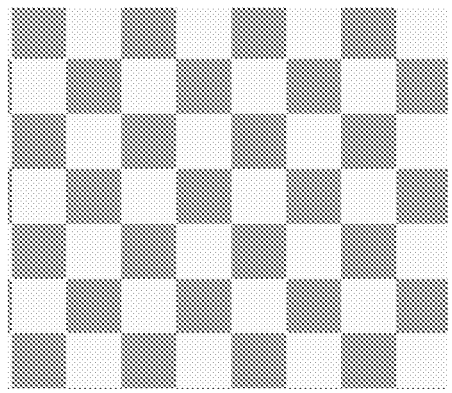
FIG. 7 schematically illustrates signals in odd frame and even frames using temporal modulation.
Figure 7:
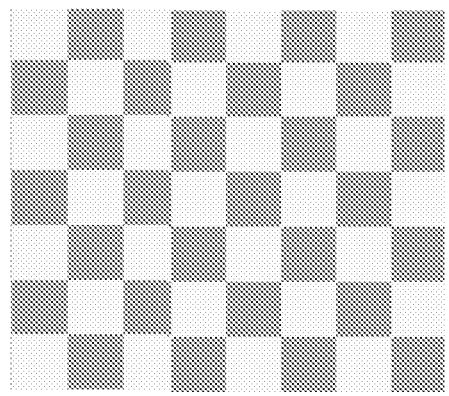
Figure 7:
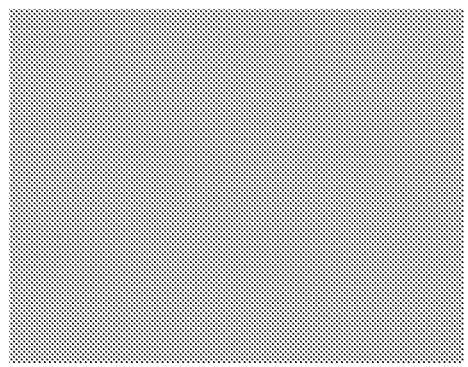

FIG. 7 schematically illustrates the signal in an odd frame being a reference checkerboard pattern plus the enhancement signal 4 and in an even frame (or vice versa) being the negative of the reference signal of the odd frame plus the enhancement signal 4. Subtracting the two signals, as schematically shown in FIG. 5 will provide the reference signal. This signal can then be sent to the processor 3. In FIG. 7 it is schematically illustrated that the intensity is modulated with a checkerboard pattern. The absolute value of the difference of the two signals provides the reference image signal.

In preferred embodiments it is possible to decrease/increase some colour (e.g. green) while increasing/decreasing other colours (e.g. blue and red) in odd/even frame reference patterns. The increase can be selected such that the luminance does not vary at all over a frame while the colour variations average out over a number of frames.

Human viewers are less sensitive to colour changes than to luminance changes. Again this embodiment can be used in any spatial pattern or even if no pattern is used for the reference signal and can also be used in the time multiplexing embodiment. Further reduction in visibility can be accomplished by shifting the spatial pattern. For instance, one could use an odd and even frame with the indicated pattern and then shift the pattern half a block for the next pairs of odd and even frames. That would reduce any visibility of the patterns. However, it would also reduce the possible measurements of the reference signal since not all pairs of odd and even frames could then be used for such measurements.

Figure 8:
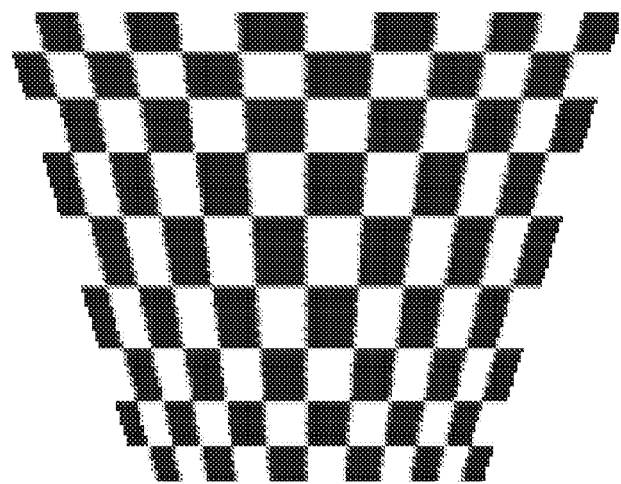
FIG. 8 illustrates an advantage of using a spatial two-dimensional pattern.

FIG. 8 illustrates an advantage of using a spatial two-dimensional pattern. An advantage of using a patterned modulation is that the pattern can be used to register the image from camera and the projected image. The observed (with the camera) projected pattern in general will not look like a checkerboard pattern because of depth variations in the projection plane and possible different viewing angle of camera and projector. Using motion estimation techniques it is possible to establish the local displacement and warp the camera image so as to match the projection from the projector optimally to the object on which the image is projected. The markers in the image, which in this case are formed by the boundaries between the areas of the spatial pattern allows such matching. As explained above the difference signal will provide for a checker board pattern with twice the amplitude of the reference signal, this will allow distinguishing the boundaries between areas and thereby making alignment possible. More advanced aligning is possible by providing more complex patterns, for instance four patterns, wherein the sum of the patterns is an equal illumination. This could require somewhat longer sequences of patterns, but allows more advanced aligning.

The embodiments above illustrate time multiplexing or addition of signals.

The invention is not limited to these examples.

A mix of the two above embodiments is for instance the following scheme, also falling within the invention wherein time multiplexing is used in a slightly different scheme:

in a first time slot, or a number of time slots, only the enhancement signal is emitted and in a second time slot, or a number of time slots, the enhancement signal plus the reference signal is emitted.

The two time slots are in length the same so that the integrated intensity of the enhancement signal is the same and/or the recorded signals are multiplied so that the integrated intensity of the enhancement signal is the same. At the recording end the signals are demultiplexed and subtracted from each other leaving only the reference signal. If the two time slots are not the same, for instance a time period $t_1$ for the first time slot and $t_2$ for the second time slot, the reference signal can be obtained by subtracting $t_1/t_2$ times the second signal from the first signal.

The advantage of this embodiment compared to the one of FIG. 4 is that a stronger reference signal could be provided. The advantage compared to subtracting subsequent frames as in FIG. 6 is that no time delay is needed and there are no, or less problems with motion of objects within the image in the time during frames. The two signals that are subtracted originate from one and the same frame, thus there is no time difference to take into account or motion compensation.

Yet a further example of time multiplexing is the following:
in a first time slot with length $t_1$ the reference illumination signal is emitted, derived from the reference data
in a second time slot with length $t_2$ the enhancement illumination minus $t_1/t_2$ times the reference illumination signal is emitted. This can be accomplished by providing during this time slot to the illumination device data equivalent to the illumination data minus $t_1/t_2$ times the reference data.

The total illumination of the object is then:
$t_1*$(reference illumination)$+t_2*$(enhancement illumation$-t_1/t_2*$(reference illumination))$=t_2*$enhancement illumation The reference illumination has, on average, no effect on the illumination of the object. The human eye which is incapable of following fast fluctuations does not see the reference illumination.

The invention can be used in a variety of technical fields:

The fields of application include but are not limited to such applications as interior lighting, shop lighting, operation theatre lighting, and car headlights.

Highlights, contrast and colour can all be enhanced for e.g. pictures, posters or statues in a living room, museum or gallery. In general every object in the interior can be enhanced by the invention, which can also be seen as economic (green) since no light energy is spilled on scene parts unintentionally. In embodiments the system is arranged to emit those colours that are least absorbed at that location of the object, thus increasing the efficiency of the illumination effect. In this case low-energy lighting is the goal as well as visual enhancement.

In a shop environment, the enhancement lighting can be used to increase the attractiveness or the attention value for certain products. It is remarked that not only square regions but highlight spots of arbitrary shapes can be used. The system in an embodiment in a shop environment could track a person as he/she is walking along a display and adjust the projected image accordingly.

In an operation theatre, the enhancement lighting can be used to improve the vision of the surgeon.

In a car headlight, in embodiments a pixelated light source with camera feedback is used to improve vision of the driver in poor weather conditions. In such conditions a steady enhanced illumination is of vital importance. The headlights then highlight for instance objects, such as trees or traffic signs, along the side of the road.

A yet further application is in theatres and for music performances. The object to be highlighted is then for instance a singer or actor who is moving on the stage. In such applications the enhancement signal 4, i.e. the algorithm with which the enhancement lighting is performed, does not need to be fixed but for instance be made dependent on time, the position on the stage or the piece of music that is being performed. Also the processing could be used to segment out the actor (in general every noteworthy object) and emit light to the relevant scene segments only (adjustable-spot spotlight, or tracking spot).

The illumination device can be of various types, as long as the device is capable of projecting an image and adjust the illumination of parts of the image. The projection does not have to be of the same detail as the object. A somewhat coarse projected image may work as well. If the illumination device has a very low resolution compared the resolution of the viewer, it may be advantageous to, e.g. optically, blur the enhancement image. The illumination device can be of a type that projects an image as a whole, such as for instance an LCD projector, or one that projects an image by scanning pixels or scanning image lines.

The illumination device in embodiments comprises a light valve (LCD, DMD) device to spatially modulate the light from a light-source.

The illumination device in embodiments comprises a scanning modulated light beam generator (LED or LED-laser) device to spatially modulate the light shed on the object.

The illumination device in embodiments comprises a scanning linear array of modulated light beam generators (LEDs or LED-lasers) device to spatially modulate the light shed on the object.

The recording device can be one of many types; in embodiments the recording device comprises an image sensor device such as a CCD, CMOS. In other embodiment the recording device comprises a photo sensor such as a photo diode to detect the amount of light reflected at a certain point in time from a scanned scene or a linear array of photo sensors to detect the amount of light reflected at a certain point in time from a scanned scene.

A particular advantageous embodiment is formed by a projector comprising a pixelated lamp. Lighting systems have become adaptable in terms of intensity and more recently, with the introduction of light-emission diode (LED) lamps, in terms of the colour too. LEDs can be controlled very fast in terms of brightness and colour, using pixilated lamps that allow (low-resolution) image/atmosphere projection. In pixelated lamps the lamps is comprised of a multitude of minilamps, such as LED's wherein the lamps projects an image.

Figure 9:
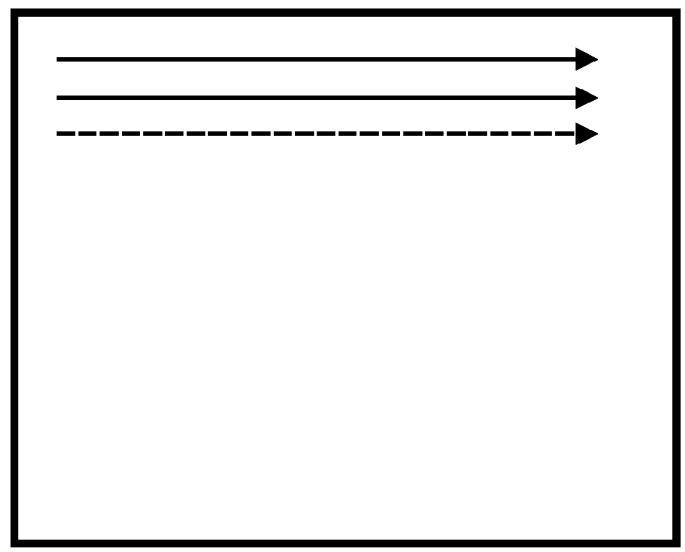
FIG. 9 illustrates schematically an embodiment wherein an image is made by scanning.

FIG. 9 illustrates such an image. The images are composed of a number of lines of pixels that are scanned sequentially, schematically indicated in FIG. 9 by the lines running from left to right. For instance a laser device with a moving mirror can be used to compose an image by scanning line by line. A pixelated lamp using LED's could also be used for this purpose. Alternatively the image can be shown line by line and the lines are scanned from the top of the image downwards.

When the individual pixels of the projected image are scanned, the individual pixels are distinguishable in the recorded image, which is an advantage for alignment purposes. The disadvantage is that most of the pixels are off at any time.

Time multiplexing can be done by scanning a pixel or line of the image with an enhancement signal for providing the enhancement illumination followed by scanning the same pixel or line with a reference signal for providing the reference illumination, and recording the image in separate time slots to demultiplex the signals and extract the reference signal, i.e. the reflection of the reference illumination on the object, from the recorded image signal.

It is also possible to use time modulation of the enhancement signal by a reference signal as schematically shown in FIG. 6 and extract the reference signal from the recorded signal by subtracting recorded signals from different frames.

Figure 10:
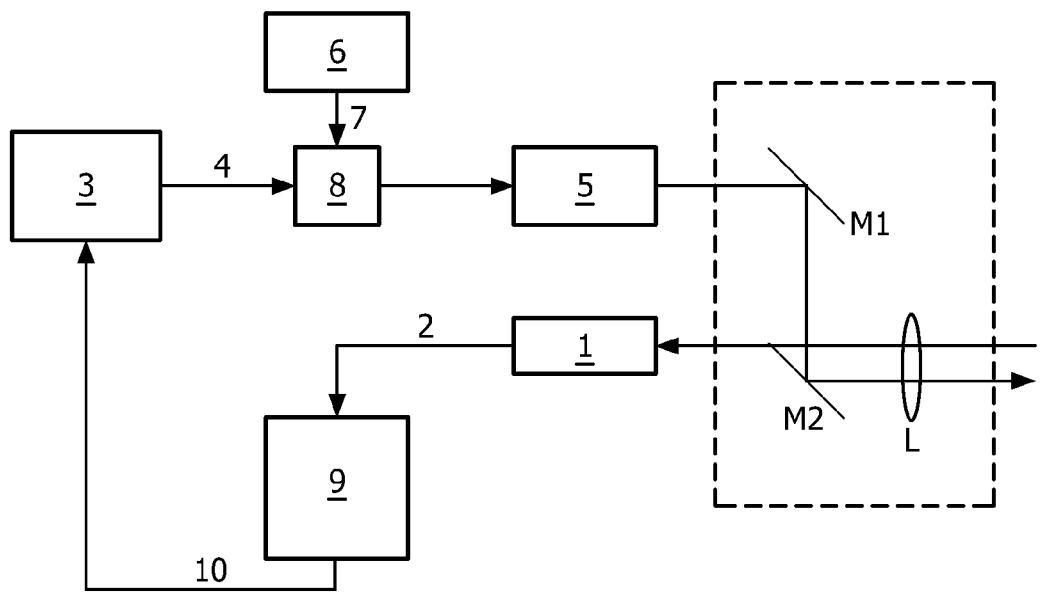
FIG. 10 illustrates an embodiment in which the recording device and the illumination device share a common optical system.

In the above figures the illumination device 5 and the recording device 1 have been shown as separate units. In preferred embodiment the illumination device 5 and the recording device 1 share a common optical system. In FIG. 10 such an embodiment is schematically shown. The projected light is, via a mirror M1 and a partially reflecting, partially transmitting mirror M2, transmitted through a common lens system L. The image is recorded through the same lens system L and the partially transmitting mirror M2. Using a common optical system has the advantage of a more compact design and less problems in regards to alignment of the projected image and the recorded image.

Figure 11:
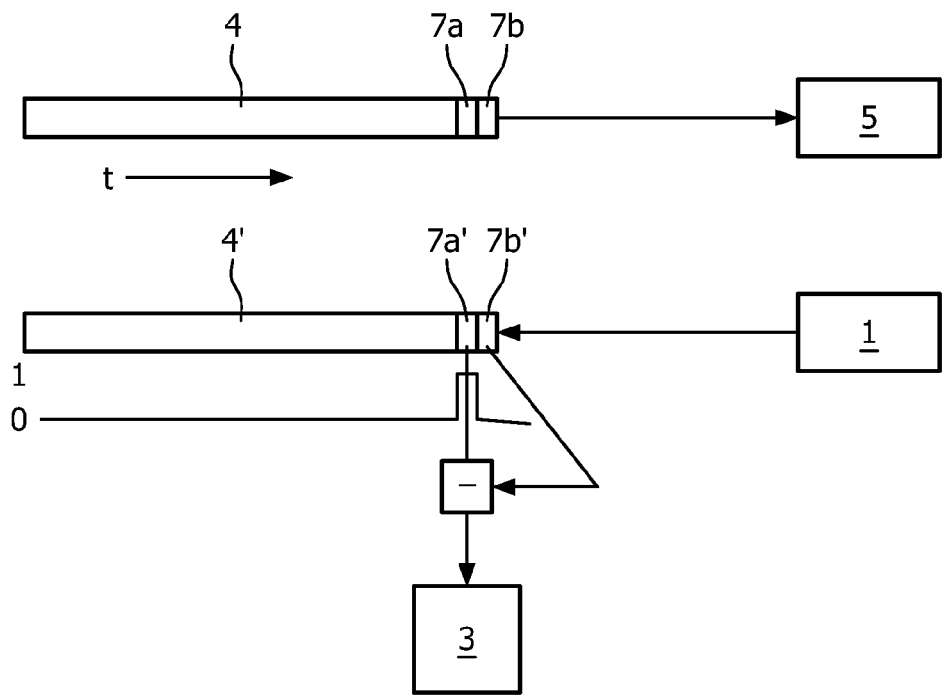
FIG. 11 illustrates a further preferred embodiment

FIG. 11 illustrates a further preferred embodiment. In this embodiment three signals are distinguishable the reference signal ($7a$, $7a'$)

the enhancement signal (4, 4')

signal not due to the illumination device, but for instance due to sunlight ($7b$, $7b'$).

In the embodiments wherein the illumination signal is modulated frame to frame with a reference signal, any signal due to other lights, such as for instance incoming sunlight will not or only to a very limited amount influence the signal 10 since the incoming sunlight will influence all frames to more or less the same extent and thus during subtraction the influence of incoming sunlight is lost. However, in the time multiplexing embodiment additional light not coming from the illumination device could be perceived as to be part of the reference image. Thus a bright spot on a picture due to a reflection of sunlight in a window falling on a painting will be seen as a part of the painting and be highlighted. For car headlights the illumination due to street lights or sunlight could pose a similar problem. FIG. 11 illustrates an embodiment to overcome or at least reduce this problem. During time multiplexing there are at least three time slots, one for the enhancement signal 4, one slot $7a$ for the reference signal $7a$ and slot $7b$ for no signal at all, i.e. no light coming from the illumination device. The reference image signal can then be found by subtracting the signals corresponding to time slots $7a$ and $7b$.

An alternative method which does not require an additional time slot in the multiplexing scheme is to modulate the reference signal in time slots 7, for instance in odd frames 0.8 time a reference signal and in even frames 1.2 times a reference signal and then subtract the odd from even images or vice versa. The signal due to sunlight is then cancelled leaving only 0.4. times the illumination due to the reference signal.

Figure 12:
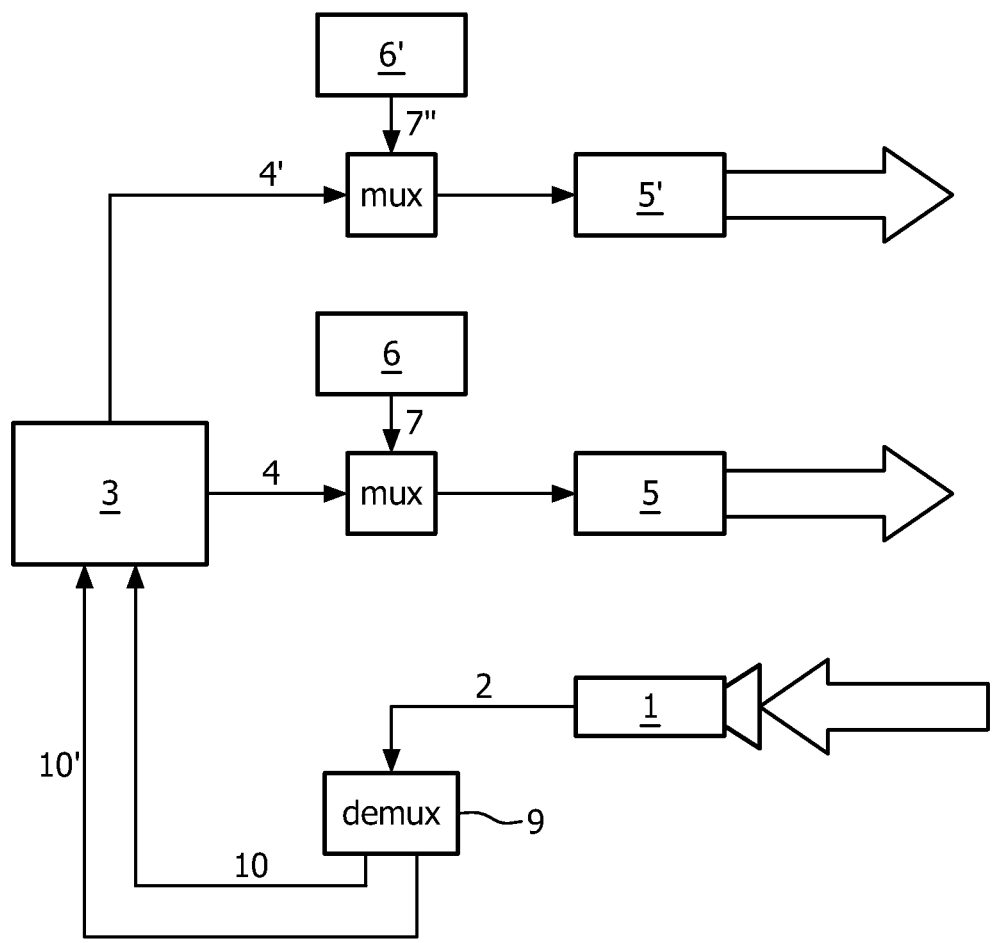
FIGS. 12 and 13 illustrate embodiment in which the system comprises more than one illumination devices.

FIG. 12 illustrates an embodiment in which a single recording device 1 is used, but more than one, in this example two, illumination devices 5 and 5'. In this embodiment the two reference signals are multiplexed wherein, for instance, the time slots for the reference illuminations for the two illumination devices differ and preferably do not overlap.

The demultiplexer demux is then able to dissect the recorded data and split off the reference illumination of both of the illumination devices. Preferably, to avoid complications the enhancement signal of illumination device 5 is put to zero to avoid cross talk between the two reference illuminations.

Figure 13:
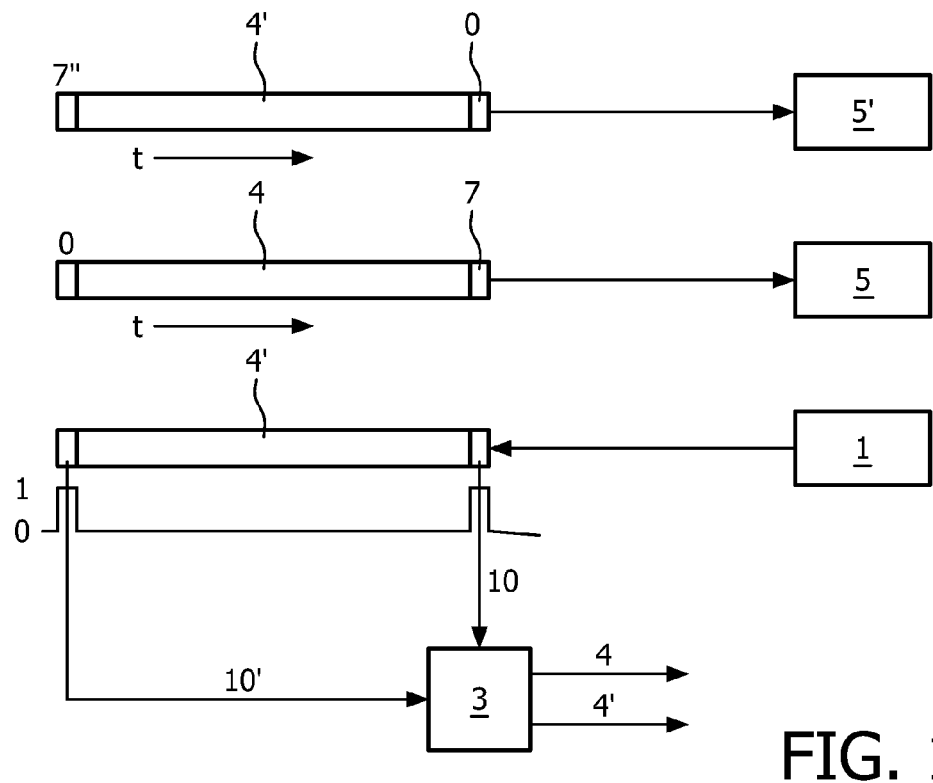

FIG. 13 schematically illustrates such arrangement:

To illumination device 5 a signal is sent that is zero 0 during a first time slot, the enhancement signal 4 during a further time slot, and the reference signal 7 during a final time slot.

To illumination device 5' a signal is sent that comprises the reference data 7'' during a first time slot, the enhancement signal 4 during a further time slot, and zero during a final time slot.

The demultiplexer demux can then distinguish the reference illumination signal from both of the illumination devices. The illumination devices 5 and 5' will have to operate in synchronisation for this embodiment to work.

Using a single recording device while using two or more illumination devices has at least two advantages: it is more efficient and, compared to using two recording devices any problem with synchronisation of the two recording devices is avoided.

Of course, the number of illumination devices is not restricted to two; more than two illumination devices can be used. When the reference illumination is patterned, the patterns for the two illumination devices preferably differ to allow a further distinction between the two.

Figure 14:
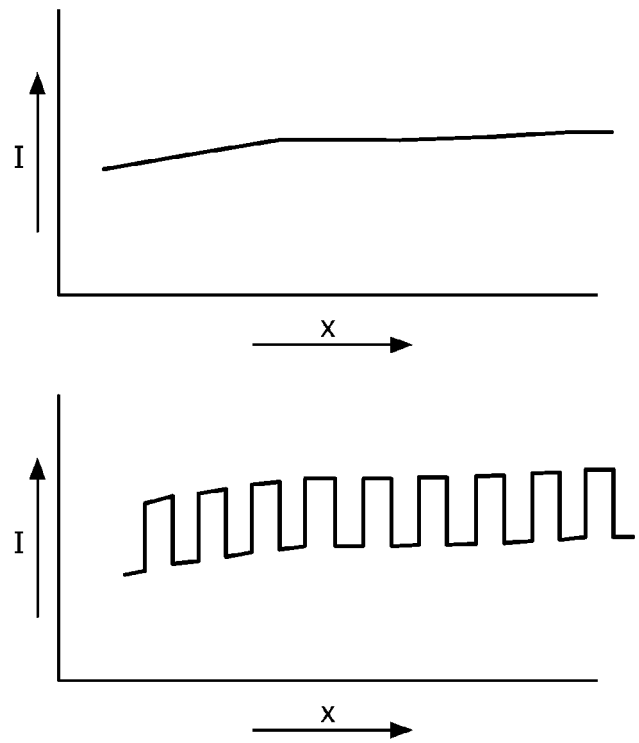
FIGS. 14 and 15 illustrates embodiment in which spatial modulation is used

Yet a further embodiment of the invention is schematically illustrated in FIG. 14.

In the graph at the top part of FIG. 14 the enhancement illumination is illustrated. The vertical axis gives the intensity I. The horizontal axis gives, for a rows or line of pixels, the position x. The reflected image will show a similar spatial pattern.

The graph at the bottom part of the FIG. 14 shows a sum of the enhancement illumination and the reference illumination. In this example of the invention the enhancement illumination is spatially modulated by the reference illumination. An example of such spatial modulation is to add and subtract from the enhancement intensity at neighbouring pixels a fixed value. Assuming that the enhancement illumination varies relatively slowly from pixel to pixel it then becomes possible, by applying a spatial filter to the recorded image data to spatially filter the reflection due to the reference illumination from the recorded image data.

This is an example of an embodiment in which the enhancement illumination is spatially modulated with the reference illumination.

Figure 15:
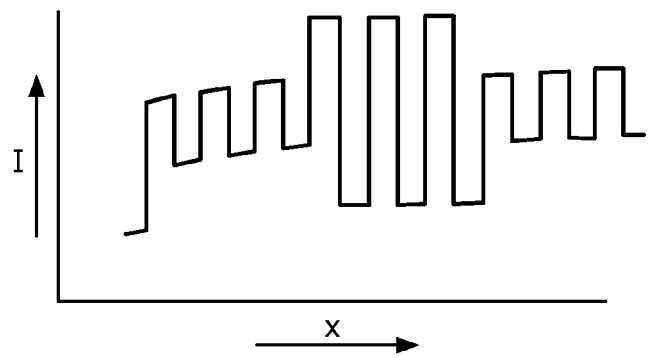

FIG. 15 illustrates a further, more complex example of spatially modulating the enhancement illumination with a reference illumination.

In this example the reference illumination itself also comprises a further spatial pattern. In this example the value of the reference illumination shows two different steps in height. When this difference in height is applied in two directions, a checkerboard pattern equivalent to the one shown in FIG. 7 will emerge.

In the above given examples a common illumination sources was used for providing the reference and enhancement illumination. Mixing of the reference and enhancement illumination was performed by mixing data signals prior to sending the mix of data signals to the common illumination device. The combined illumination from the single illumination source comprises at least two distinguishable composing constituents, being the reference illumination and the enhancement illumination. At the recording end of the system, the reverse process of what was done at the emitting end is performed, untangling the two constituting illuminations, or at least extracting one of the constituting illuminations, namely the reference illumination.

This concept can be generalized:

In formula form the emitted light can be described as:

$$I(x,y,t) = F\{I_{reference\ illumination}(x,y,t); I_{enhancement\ illumination}(x,y,t)\}$$

Where I is the emitted light as a function of spatial position (x,y) and time t. The emitted light is dependent on the intensity of the reference illumination which is a function of space (x,y) and/or time t as well as being dependent on the enhancement illumination, also being a function of space and/or time.

The reflected light from the object will also be a function of the reflection by object of the reference illumination and of the enhancement illumination:

$$R(x,y,t)=F'\{R_{reference\ illumination}(x,y,t); R_{enhancement\ illumination}(x,y,t)\}$$

The reflected image is filtered to obtain the reflected image due to the reference illumination.

$$\text{Filter } \{R(x,y,t)\} \cdot R_{reference\ illumination}$$

The data on the reflected image due to the reference illumination is used to provide information for the enhancement illumination.

There are a number of ways of performing the invention.

The process of mixing two illuminations can, instead of using a common illumination source, be performed by using two separate illumination sources. In other words, instead of mixing data signals in the electrical domain, and then sending them to a common illumination source, one can also perform the mixing of signals in the optical domain, by combining two light emissions from separate light sources on the object.

Figure 16:
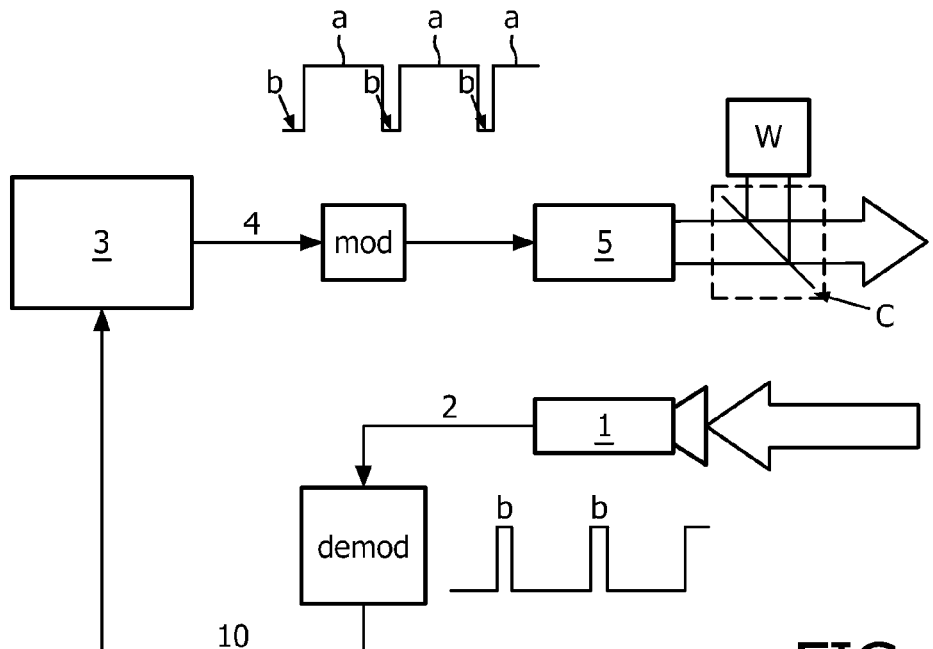
FIG. 16 illustrates an embodiment using separate reference and enhancement illumination devices.

FIG. 16 illustrates an example of such an embodiment.

In this example the system comprises two separate illumination sources. The system comprises a white light generator W for generating a reference illumination and the system comprises an enhancement illumination device 5. To the enhancement illumination device 5 enhancement illumination data 4 are provided. The enhancement data are modulated such that during times a the enhancement illumination device 5 is emitting light, while during times b the enhancement illumination device 5 is not emitting any light. This is a form of time modulating the emission of enhancement illumination device 5. The light source W is emitting all of the time. The two devices 5 and W share a common optical unit C, in this example being formed by a partially transparent, partially transmitting minor and possibly a lens system in front of the minor. The object illuminated by the mix of the emission from enhancement illumination device 5 and white light source W reflects during times b only light from the white light source W, i.e. the reference illumination. By filtering, at the recording side, the incoming data such that only data are gathered during time b, the reference illumination is measured. Such filtering is a type of time demodulation of the recorded signal.

It is remarked that instead of not emitting light at times b, the same can be achieved in the optical domain by for instance a rotating wheel in front of enhancement illumination device 5. Another example would be the use of a switchable mirror, switching from transparent to reflective at the position of the partially transparent, partially transmitting mirror in FIG. 16.

Thus at the emitting side the mixing of reference and enhancement illuminations can be done in the electrical domain, by mixing signals and using a common illumination device, as well as in the optical domain, by using two different light sources and mix the two light beams before they fall on the object.

For the filtering at the receiving end a similar duality in approach exists. In the above signals an image signal is recorded. This image signal is then fed to a data filter to filter out the reflection due to the reference illumination.

There are, however, a number of solutions for filtering at the recording end the light impinging on the light recording device that do not require data filters applied on the recorded image data.

For those embodiments in which specific time slots in a multiplexing scheme are reserved for the reference illumination a possibility is to have the recording device only operational within those specific time periods. This can be applied in a number of ways:

By for instance using a CCD device which is timed to record data only during the specific time periods within the multiplexing scheme allotted to the reference illumination. The only data received by the CCD would then be the data due to the reference illumination. No subsequent data filtering is needed. The time filter is applied directly on the CCD device.

By blocking, using an optical shutter, the light in front of the light recording device at all times but for the specific time periods. This is a hardware embodiment of a filter to filter light impinging on the light recording device. The shutter is synchronized with the multiplexing scheme. No data filtering is needed on or within the recording data. Filtering is done before recording in the optical domain. The time controlled shutter then acts as a filter.

The filtering action can thus be done prior to recording, i.e. by filtering the light by some optical filter in front of the recording device. Especially where the reference and enhancement illumination are distinguishable because they have different time profile, a time controlled shutter in front of the recording device can be used. Preferably, however, filtering is done on the recorded data since this makes it easier to also analyse data on the reflection of enhancement illumination.

The image recording device can be a camera and in many preferred embodiments is a camera but in some embodiments the recording device may have only a limited number of pixels, with, at the limit, only a single pixel covering the whole of the image.

Figure 17:
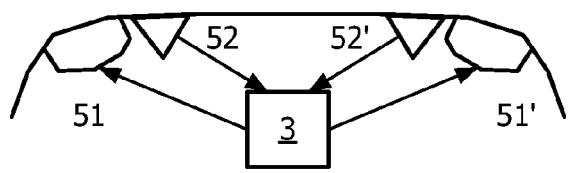
FIG. 17 illustrates an embodiment in which the light recording device comprises a number of photo sensors The figures are not drawn to scale. Generally, identical components are denoted by the same reference numerals in the figures.

An example of such an embodiment is illustrated in FIG. 17.

FIG. 17 shows a car with headlights. The headlights 51, 51' are arranged for providing enhancement illumination as well reference illumination for illuminating the road ahead. At the front of the car a light recording device 52, 52' comprising a matrix of n×m photo sensors is provided, in this example one light recording device for each of the head lights, where n and m are a number between 1 and for instance 8. In the most extreme case the recording device is a single photo sensor. Time multiplexing allows each photo sensor to measure the effect of the corresponding segment of the corresponding head light, see for instance FIG. 13 for a possible scheme. In the most basic form a single photo-sensor is used as the matrix, in other words n and m are 1.

The photo sensors measure the effect of the headlight when emitting reference illumination wherein the head light are segmented into areas corresponding to the matrix of photo sensors.

The light recording device is thus a device for recording the reflected image, the number of pixels can be any number. In preferred embodiments the device for recording is a camera since it allows greater definition.

In short the invention can be described as follows:

A system for enhancing the appearance of an object comprises an illumination device for providing enhancement illumination and a light recording device for recording the reflection by the object of illumination on the object. A reference illumination is mixed with the enhancement illumination. The information in the reflected light is filtered to filter the reflection data due to the reference illumination. These data are used for calculating the enhancement illumination in a processor.

In the claims, any reference signs placed between parentheses shall not be construed as limiting the claim.

The word "comprising" does not exclude the presence of other elements or steps than those listed in a claim. The invention may be implemented by any combination of features of various different preferred embodiments as described above.

The invention claimed is:

1. An illumination system comprising:
   a light recording device for producing, from light impinging on the object, recorded image data of the object;
   an illumination device for illuminating the object;
   a processor for generating, from the recorded image data of the object, enhancement illumination data for effecting illumination of the object with an enhancement illumination to enhance the appearance of the object;
   a generator for effecting the generation of reference data representing a reference illumination;
   a mixing apparatus for effecting mixing of the reference illumination with the enhancement illumination and for providing said mixed illumination to the illumination device as common source for illuminating the object with the reference illumination and the enhancement illumination; and
   a filter for receiving from the recording device object-reflected mixed image data resulting from reflection by the object of said mixed illumination, said filter being adapted to filter object-reflected reference image data from the received object-reflected mixed image data and to provide said object-reflected reference image data to the processor for generating the enhancement illumination data.

2. The illumination system as claimed in claim 1, wherein the filter comprises a data filter for filtering data recorded by the light recording device.

3. The illumination system as claimed in claim 1, wherein the illumination system comprises a reference illumination device for producing the reference illumination and an enhancement illumination device for producing the enhancement illumination, said enhancement illumination data being provided to the enhancement illumination device.

4. The illumination system as claimed in claim 3, wherein the reference illumination device and the enhancement illumination device share a common optical unit.

5. The illumination system as claimed in claim 1, wherein the system comprises a multiplexer (MUX) for time multiplexing the enhancement illumination with the reference illumination and the filter comprises a demultiplexer (DEMUX) for demultiplexing the recorded image data to provide the object reflected reference image data.

6. The illumination system as claimed in claim 5, wherein the multiplexer is arranged for multiplexing reference illumination with enhancement illumination and with no illumination from the illumination device.

7. The illumination system as claimed in claim 1, wherein the system comprises a modulator for time modulating the enhancement illumination with the reference illumination and the filter comprises a time demodulator for time demodulating the recorded image data for providing the object reflected reference image data.

8. The illumination system as claimed in claim 1, wherein the system comprises a modulator for spatially modulating the enhancement illumination with the reference illumination and the filter comprises a spatial demodulator for spatially demodulating the recorded image data for providing the object reflected reference image data.

9. The illumination system as claimed in claim 1, wherein the reference illumination is provided with spatial markers.

10. The illumination system as claimed in claim 9, wherein the spatial markers are formed by a spatial pattern.

11. The illumination system as claimed in claim 10, wherein the spatial pattern is a checkerboard pattern.

12. The illumination system as claimed in claim 1, wherein the illumination device is arranged for scanning the image.

13. The illumination system as claimed in claim 1, wherein the illumination device and the light recording device share a common optical system.

14. The illumination system as claimed in claim 1, wherein the system comprises more than one illumination device.

15. The illumination system as claimed in claim 1 comprising separate sources for the enhancement illumination and the reference illumination and an optical unit for forming a mix of said enhancement illumination said reference illumination for illuminating the object.

16. An illumination system comprising:
    a light recording device for producing, from light impinging on an object, recorded image data of an object;
    an illumination device;
    a processor for generating, from the recorded image data, enhancement illumination data for illuminating the object with an enhancement illumination to enhance the appearance of the object;
    a reference signal generator for providing reference illumination data;
    a mixing apparatus for mixing the reference illumination data and the enhancement illumination data, wherein the mix of reference illumination data and enhancement illumination data is provided in common to the illumination device; and
    a filter for filtering, from the mixed illumination light impinging on the light recording device, object-reflected reference image data, said object-reflected reference image data being provided to the processor for generating the enhancement illumination data.

17. A method for illuminating an object comprising:
    producing, from light impinging on the object, recorded image data representative of the object;
    producing from the recorded image data enhancement illumination data for effecting illumination of the object with an enhancement illumination;
    generating reference data representing a reference illumination;
    effecting mixing of the reference illumination with the enhancement illumination to produce mixed illumination;
    providing the mixed illumination to an illumination device as a common source for illuminating the object with the reference illumination and the enhancement illumination;
    filtering the recorded image data to supply, from the mix of reference illumination and enhancement illumination, object-reflected reference image data derived from said reference illumination;
    processing said object-reflected reference image data as a basis for generating the enhancement illumination.

18. The method as claimed in claim 17 where the reference illumination and the enhancement illumination originate from separate sources and are optically mixed for illuminating the object.

* * * * *